United States Patent
Sundkvist et al.

(10) Patent No.: US 7,533,010 B2
(45) Date of Patent: May 12, 2009

(54) METHOD AND SYSTEM FOR TREAD PATTERN NOISE OPTIMIZATION

(75) Inventors: Karl Eric Sundkvist, Akron, OH (US); Robert John Danforth, III, Sheboygan, WI (US); Rajender R. Manthani, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/217,890

(22) Filed: Sep. 1, 2005

(65) Prior Publication Data

US 2007/0078633 A1    Apr. 5, 2007

(51) Int. Cl.
G06G 7/48    (2006.01)

(52) U.S. Cl. .............................. 703/8; 703/7

(58) Field of Classification Search .............. 152/209; 703/6, 1, 7, 8; 73/146
See application file for complete search history.

(56) References Cited

U.S. PATENT DOCUMENTS

| | | | | |
|---|---|---|---|---|
| 4,178,199 A | * | 12/1979 | Lippman et al. | 29/894.37 |
| 4,399,851 A | * | 8/1983 | Bschorr | 152/156 |
| 4,727,501 A | | 2/1988 | Parker et al. | |
| 4,788,651 A | * | 11/1988 | Parker et al. | 703/6 |
| 5,209,793 A | * | 5/1993 | Cusimano, II | 152/209.2 |
| 5,314,551 A | * | 5/1994 | Williams | 152/209.2 |
| 6,430,993 B1 | * | 8/2002 | Seta | 73/146 |
| 2003/0172728 A1 | * | 9/2003 | Gustafsson et al. | 73/146 |
| 2004/0254472 A1 | * | 12/2004 | McQuilkin | 600/473 |

FOREIGN PATENT DOCUMENTS

| EP | 329927 A2 | 8/1989 |
|---|---|---|
| WO | WO0158703 A1 | 8/2001 |

OTHER PUBLICATIONS

K. T. Danielson, A. K. Noor, J. S. Green, 1996, Computers & Structures, vol. 61, No. 4, pp. 673-693.*
K. T. Danielson, A. K. Noor, J. S. Green, 1996, Computers & Structures, vol. 61, No. 4, pp. 673-669.*

* cited by examiner

Primary Examiner—Hugh Jones
(74) Attorney, Agent, or Firm—Howard M. Cohn (57) ABSTRACT

A method and system providing for tire tread design with improved noise characteristics is disclosed. The volume of air created by the lateral grooves that separate each tread block, referred to as a void, is computed at various sampling areas around a tire to generate a void function. The void function is measured at the boundaries of the tire footprint. The footprint of the tire is the portion of the tire that is in contact with the road surface. There is a correlation between the void function, and tire noise. Depending on the tread design, the void function changes as the tire rotates. By minimizing fluctuation in the void function over the course of a complete tire rotation, the tire noise can be reduced.

4 Claims, 11 Drawing Sheets

| SOLUTION IDENTIFIER | PARAMETER 1 VALUE | PARAMETER 2 VALUE | RANK |
|---|---|---|---|
| Original | 0 mm Rib shift in Zone 1 | 0 mm Rib shift in Zone 2 | 0.2193 |
| 1 | -24 mm Rib shift in Zone 1 | 2 mm Rib shift in Zone 2 | 0.0000 |
| 2 | -46 mm Rib shift in Zone 1 | -14 mm Rib shift in Zone 2 | 0.0597 |
| 3 | 14 mm Rib shift in Zone 1 | -14 mm Rib shift in Zone 2 | 0.4879 |
| 4 | -34 mm Rib shift in Zone 1 | 12 mm Rib shift in Zone 2 | 1.0000 |

FIG. 10

METHOD AND SYSTEM FOR TREAD PATTERN NOISE OPTIMIZATION

FIELD OF THE INVENTION

The present invention relates to a method and system for designing a tire tread. More specifically, the present invention relates to a method and system for designing a tire tread with improved noise characteristics.

BACKGROUND OF THE INVENTION

The tread of a typical tire is divided into multiple tread blocks. The tread blocks are raised, and support the load of the vehicle. The tread blocks are arranged in multiple rows around the circumference of the tire, known as "ribs". The ribs are separated from each other by circumfrential grooves. Along each rib, each tread block within that rib is separated from adjacent tread blocks. The gap between the adjacent tread blocks is referred to as a lateral groove.

As a tire rotates on a road surface during vehicle operation, noise is generated. In particular, as the tire contacts the road surface, the individual tread blocks create air disturbances upon impact with the road. This creates noise at multiple frequencies, broadly referred to as "tire noise".

There are multiple sources of tire noise, including the impact of the tread block on the road surface, the vibration of the tire carcass, and air disturbances which occur as the tread blocks become compressed by the weight of the vehicle, and expand into the grooves separating adjacent tread blocks.

It is desirable to minimize tire noise. This can be accomplished by an optimal tread design, thereby reducing the amplitude of the sound energy, or distributing the sound energy over a relatively wide spectrum of audible frequencies to make the tire noise less noticeable or less objectionable. What is needed, then, is a method and system for choosing a tread design with improved noise characteristics.

SUMMARY OF INVENTION

The present invention provides a method and system for improved tire tread design. More particularly, the present invention provides a method and system for a tire tread design that has reduced noise, while still maintaining the base fundamentals of the tread, such as tread block stiffness.

The volume of air created by the lateral grooves that separate each tread block is referred to as a void. The footprint of the tire is the portion of the tire that is in contact with the road surface. The amount of void crossing the footprint edge is referred to as the "void function." There is a correlation between the void function, and tire noise. Depending on the tread design, the void function changes as the tire rotates. By minimizing fluctuation in the void function over the course of a complete tire rotation, the tire noise can be reduced.

The system of the present invention accepts an existing tread design data file as input. Together with the tire footprint, and other user specified data, one or more modified tread designs are generated. For each modified tread design, estimated noise performance data is calculated. The user then selects a modified tread design, using the estimated noise performance data as a guide for choosing the improved tread design. Once the preferred tread design is chosen, the tread pattern can be printed, or saved in an appropriate data format, allowing for the incorporation of the improved tread design in the tire designs prior to manufacture.

According to the present invention, there is disclosed a method for modifying an existing tread pattern. The method comprises the steps of: importing an original tread design; processing the original tread design; importing a tire footprint; processing the tire footprint; establishing a design space; establishing harmonic goals; selecting an edge of the footprint for processing; generating at least one modified tread pattern; computing a void function for the modified tread pattern and associated harmonic levels; whereby a numerical value is associated with the modified tread pattern, the numerical value providing a ranking of the noise characteristics of the modified tread pattern.

Also according to the present invention, the step of processing the tread design further comprises the steps of: establishing a plurality of sampling areas laterally around a tire having the tread pattern; and measuring the volume of void at each sampling area.

Further according to the present invention, the step of processing the tire footprint further comprises the steps of: performing edge detection on the footprint; performing interpolation between the outer edges of the footprint; whereby a line circumscribing the footprint forms a footprint envelope.

Still further according to the present invention, the method of interpolation is a spline fit.

Yet further according to the present invention, the step of generating at least one modified tread pattern comprises the steps of: shifting at least one rib of the original tread design to create a modified tread pattern; computing a void function at each the sampling area; converting the void function to the frequency domain to generate a frequency domain void function; evaluating the frequency domain void function against the harmonic goals; generating a numerical value for the frequency domain void function; normalizing the numerical value; whereby the numerical value is presented to a user, sorted amongst other numerical values corresponding to other tread patterns, such that multiple tread patterns can be quantitatively compared with each other.

According to the present invention, there is disclosed a system for modifying an existing tread pattern, comprising: means for importing an original tread design; means for processing the original tread design; means for importing a tire footprint; means for processing the tire footprint; means for establishing a design space; means for establishing harmonic goals; means for selecting an edge of the footprint for processing; means for generating at least one modified tread pattern; whereby a numerical value is associated with the modified tread pattern, the numerical value providing a ranking of the noise characteristics of the modified tread pattern.

Also according to the present invention, the means for processing the tread design further comprises: means for establishing a plurality of sampling areas laterally around a tire having the tread pattern; and means for measuring the volume of void at each sampling area.

Further according to the present invention, the means for processing the tire footprint further comprises: means for performing edge detection on the footprint; means for performing interpolation between the outer edges of the footprint; whereby a line circumscribing the footprint forms a footprint envelope.

Still further according to the present invention, the means for generating at least one modified tread pattern comprises: means for shifting at least one rib of the original tread design to create a modified tread pattern; means for computing a void function at each the sampling area; means for converting the void function to the frequency domain to generate a frequency domain void function; means for evaluating the frequency domain void function against the harmonic goals; means for generating a numerical value for the frequency domain void function; means for normalizing the numerical value; whereby the numerical value is presented to a user, sorted amongst other numerical values corresponding to other tread patterns, such that multiple tread patterns can be quantitatively compared with each other.

Yet further according to the present invention, means are provided for displaying a plurality of modified tread patterns to a user in a ranked order, based on the numerical value.

Also according to the present invention, there are means for displaying the amount of shift applied to each rib of the original tread design to create the modified tread pattern.

Still further according to the present invention, there are means for exporting a modified tread pattern data file.

It is another aspect of the present invention to generate modified tread patterns with improved noise characteristics.

It is yet another aspect of the present invention to rank the modified tread patterns in terms of noise characteristics.

It is yet another aspect of the present invention to import a tread pattern, import a footprint, process the footprint to determine the footprint envelope, scale the footprint to overlay it with the tread pattern, allow the user to define zone boundaries, adjust the tread pattern within the zone boundaries to create modified tread patterns, compute the void function for each modified tread pattern, and rank each tread pattern based on a normalized value of its void function.

Other aspects and advantages provided by the present invention will be apparent from the detailed description that follows.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

The structure, operation, and advantages of the present preferred embodiment of the invention will become further apparent upon consideration of the following description taken in conjunction with the accompanying figures, wherein.

DETAILED DESCRIPTION OF PREFERRED EMBODIMENTS

Figure 1:
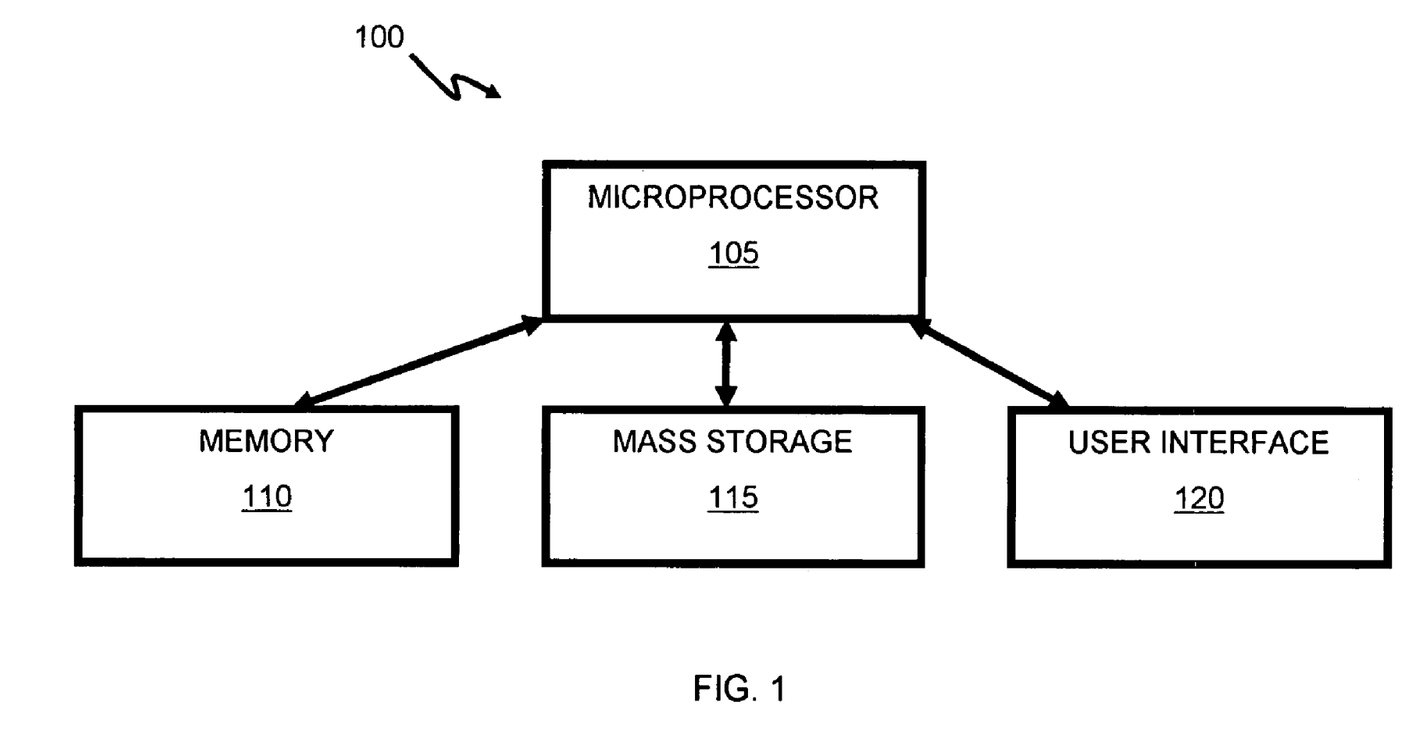
FIG. 1 is a block diagram of a system for tread pattern noise optimization, in accordance with the present invention.

FIG. 1 is a block diagram of a system that carries out the present invention. The system of the present invention is preferably implemented on a computer system 100, comprising a microprocessor 105, memory 110, mass storage device 115, and user interface 120. Other interfaces not shown may include communication interfaces to communicate over a communications network such as Ethernet and/or the Internet, allowing interface to other computers or devices such as printers and other tire manufacturing equipment.

Figure 2:
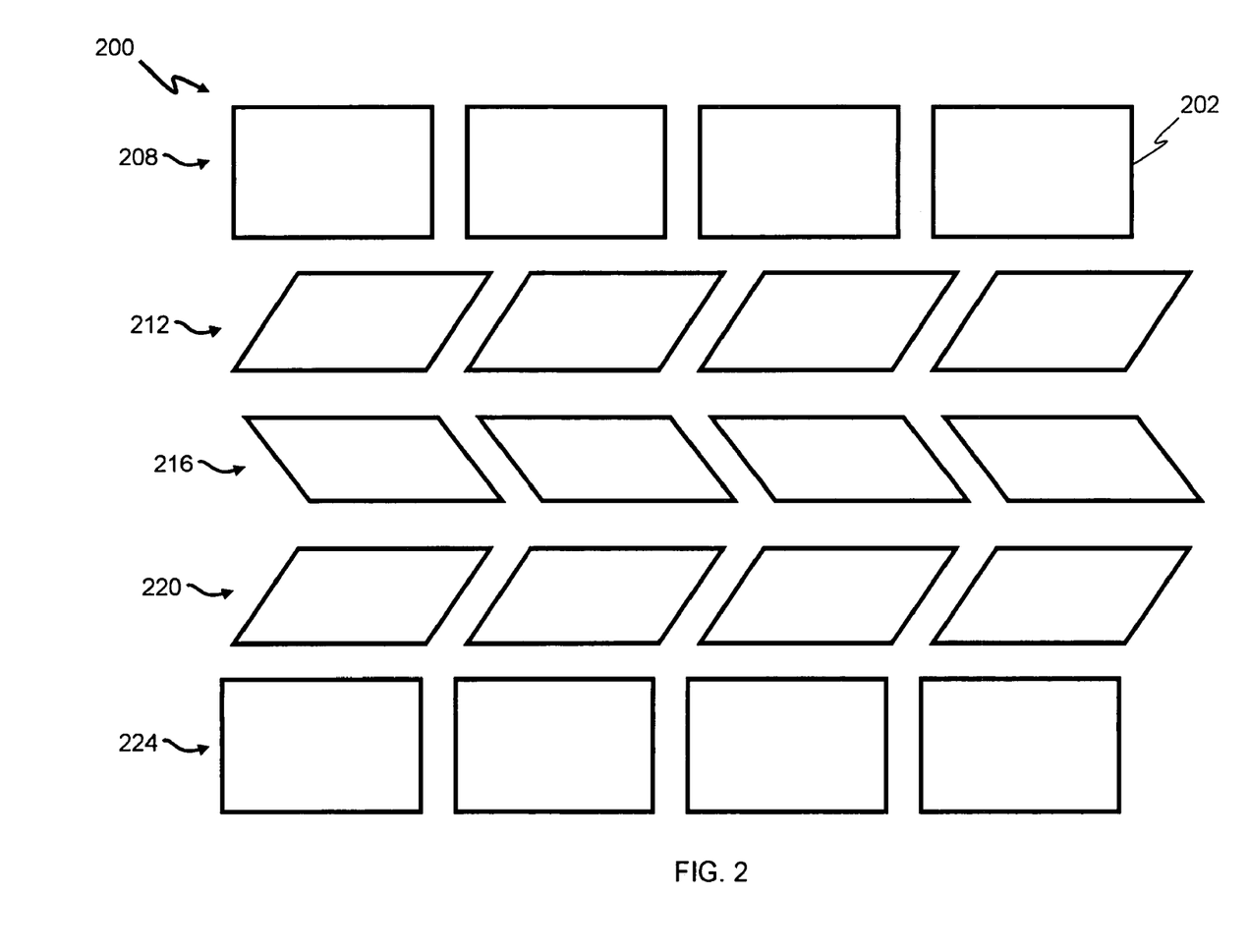
FIG. 2 is an exemplary tread pattern that has been imported into system for tread pattern noise optimization, in accordance with the present invention.

FIG. 2 is an exemplary tread pattern 200 of a tire that has been imported as a tread data file into the system 100 of the present invention. The tread pattern 200 is comprised of a plurality of tread blocks, indicated generally as 202. The tread blocks 202 are generally arranged in rows that circumscribe the tire. These rows, indicated as 208, 212, 216, 220, and 224, are referred to as "ribs".

Figure 3:
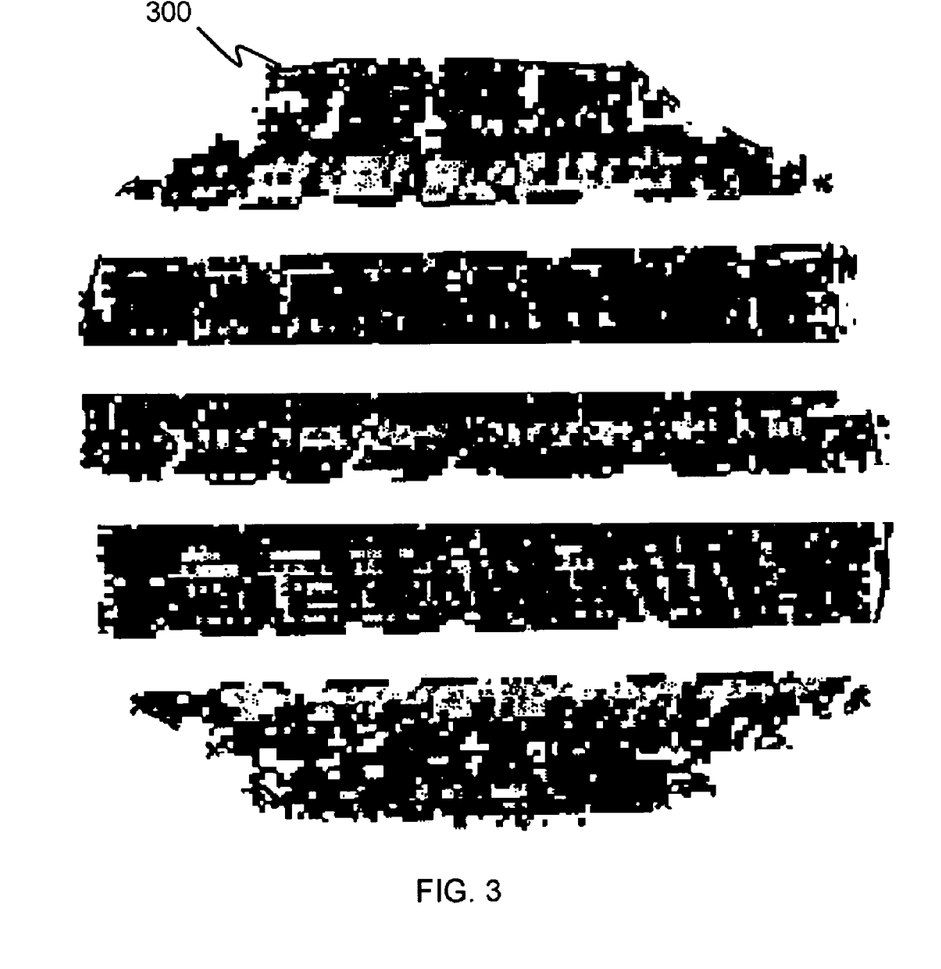
FIG. 3 is an exemplary footprint that has been imported into system for tread pattern noise optimization, in accordance with the present invention.

FIG. 3 is an exemplary footprint 300 that has been imported into the system 100 of the present invention. The footprint 300 represents the part of the tire that makes contact with the road surface under normal vehicle operating conditions.

Figure 4:
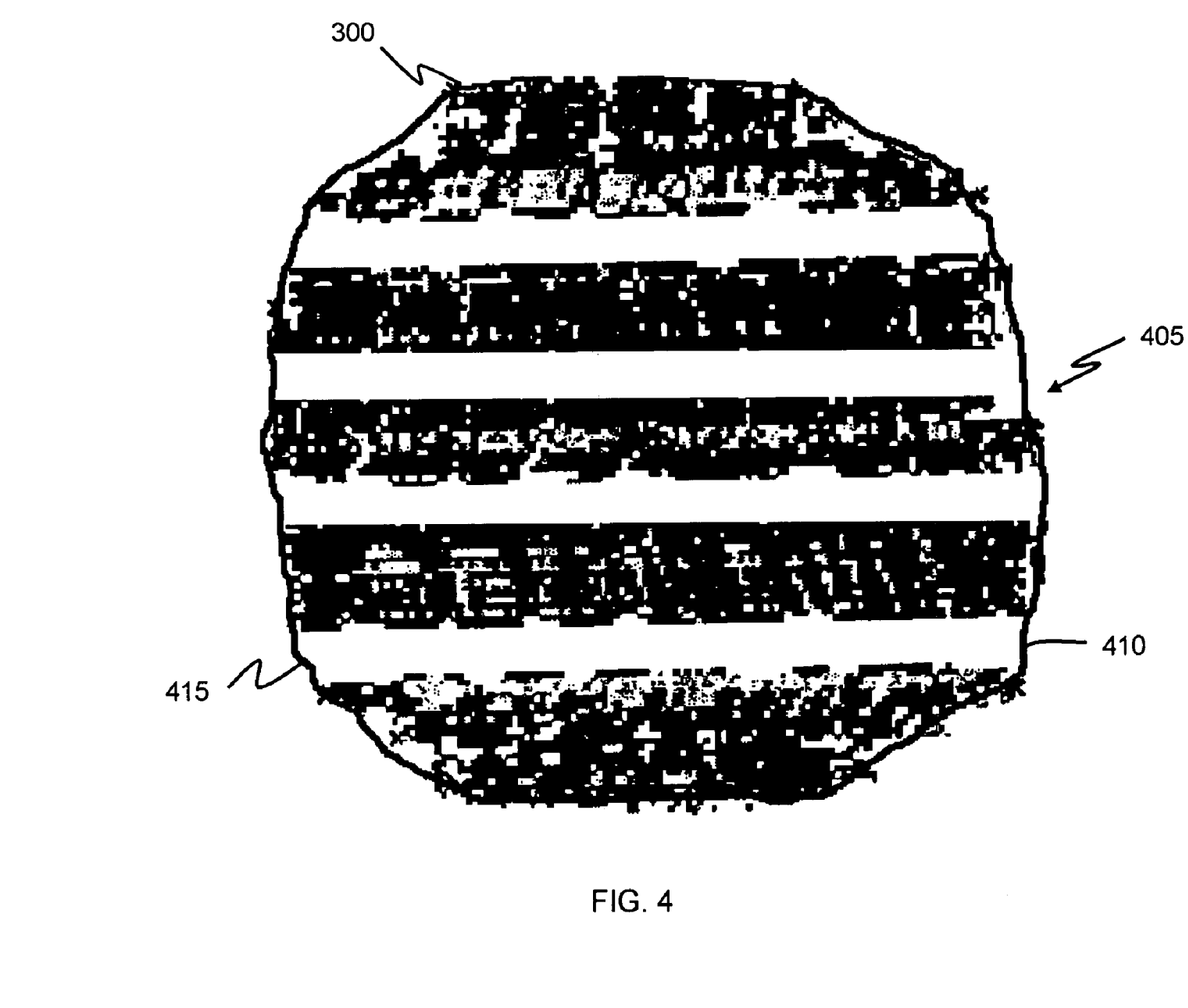
FIG. 4 is an exemplary footprint envelope computed by the present invention.

FIG. 4 is an exemplary footprint envelope 405 computed by the present invention. Footprint envelope 405 is computed from the input footprint 300 by performing edge detection, followed by interpolation to generate footprint envelope 405. Footprint envelope 405 represents the boundary of where the tire surface contacts the road surface during normal vehicle operation. The footprint envelope 405 is comprised of two edges, leading edge 410, and trailing edge 415. Leading edge 410 is the point where the tire surface first contacts the road surface during normal vehicle operation. Trailing edge 415 is the point where the tire surface separates from the road surface during normal vehicle operation. The footprint envelope 405 is calculated by first performing edge detection on the footprint to establish the edges. The outer edges of the footprint are then identified. The footprint envelope 405 is formed by making a line connecting the outer edges of the footprint. In one embodiment, the line may be generated by connecting the nearest detected points of the outer edges. In another embodiment, the user may define appropriate points along the edges and the interpolation may be performed by applying a spline fit.

Figure 5A:
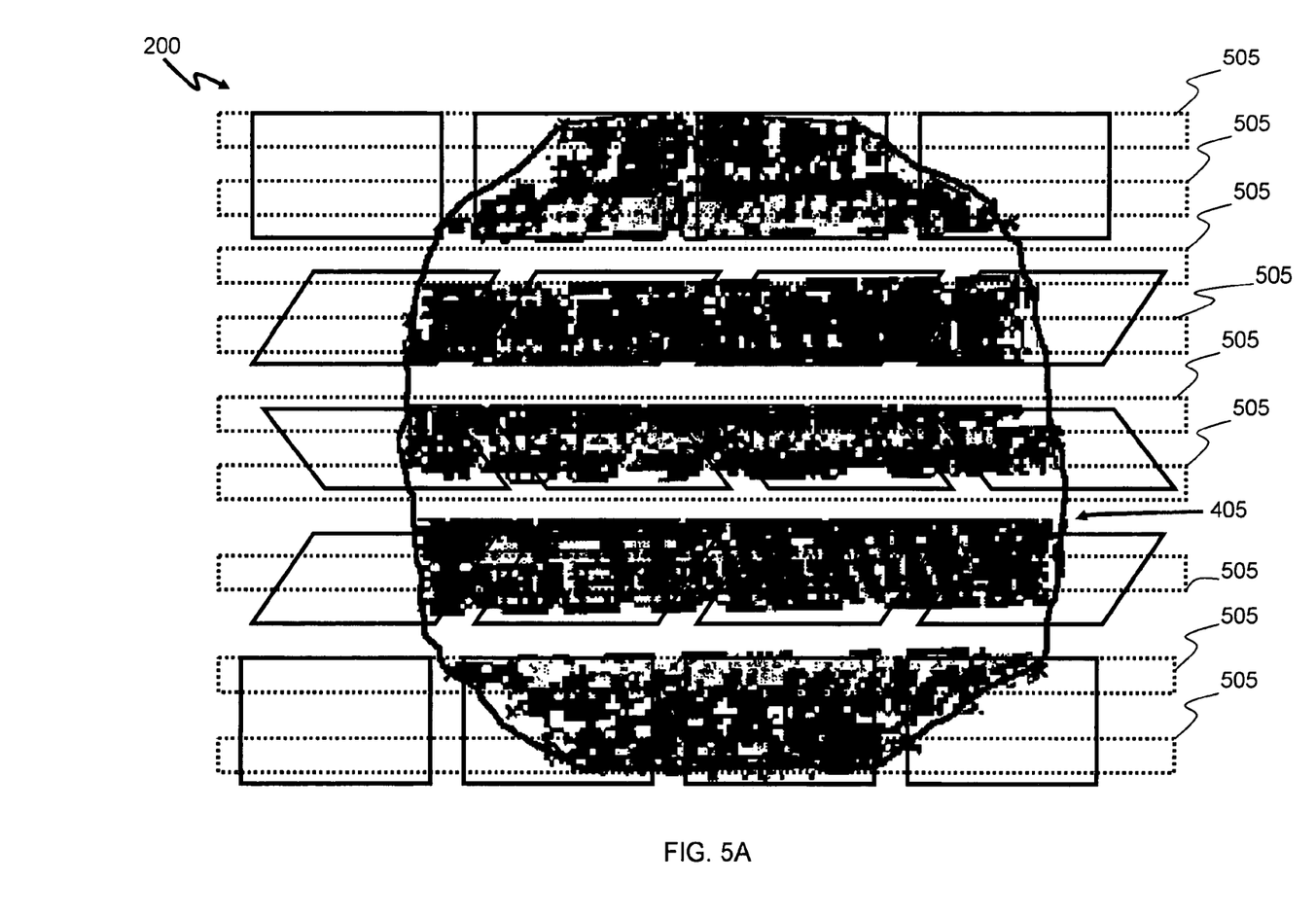
FIG. 5A is an exemplary embodiment of a user interface displaying a tread pattern overlaid with a footprint and footprint envelope system for tread pattern noise optimization, in accordance with the present invention.

FIG. 5A is an exemplary embodiment of a user interface displaying a tread pattern 200 overlaid with a footprint and footprint envelope 405. The system of the present invention evaluates the void function at the footprint envelope 405. The void is the volume of space formed by the lateral grooves between the tread blocks of the tread pattern. A plurality of sampling areas, 505 are established circumferentially around the tire. At each sampling area 505, the volume of the grooves at the intersection of the footprint envelope 405 and the tread pattern 200 is calculated, based on dimensional data from the tread pattern data file. The value of this volume is referred to as the "void" value. This is an instantaneous representation of the tread geometry entering or leaving footprint contact for a rolling tire. To fully represent one rotation of a rolling tire, the footprint is progressed incrementally around the tire circumference with void values recalculated at each increment. The void value at each sampling area 505 is then plotted to form a spatial domain void function. The spatial domain void function is Fourier transformed to the harmonic domain, based on one rotation of the tire, to form a Frequency Domain Void Function (FDVF). Since frequency is tire harmonic times the rotational frequency of the tire, harmonic and frequency domains are essentially the same. The amplitude value of the FDVF is preferably represented as $20\log(V_1/V_2)$, where $V_1$ is the volume of the void at a given sampling area (505), and $V_2$ is a reference volume, preferably 1 mm$^3$. This allows a convenient way to quantitatively compare the FDVF of various tread patterns.

Figure 5B:
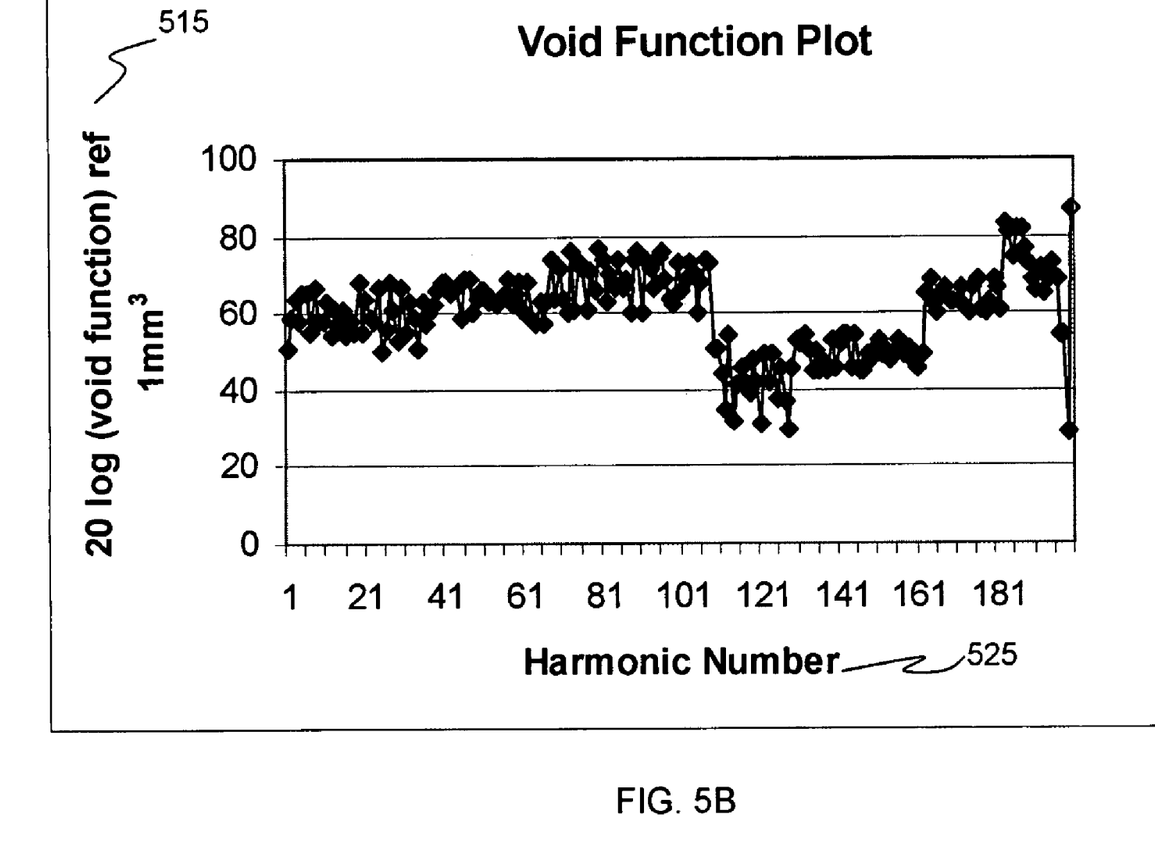
FIG. 5B is an exemplary data plot of the harmonic domain void function, in accordance with the present invention.

FIG. 5B shows an exemplary plot of the FDVF. The horizontal axis displays the harmonic number (reference 525). The harmonic number represents the frequency of occurrence of a particular disturbance within a full rotation of the tire. The vertical axis provides the void function value (reference 515). The design goals typically involve constraining the void function value to a harmonic range, typically between 30 and 95, based on a $20\log(V_1/V_2)$ scaling.

Figure 6:
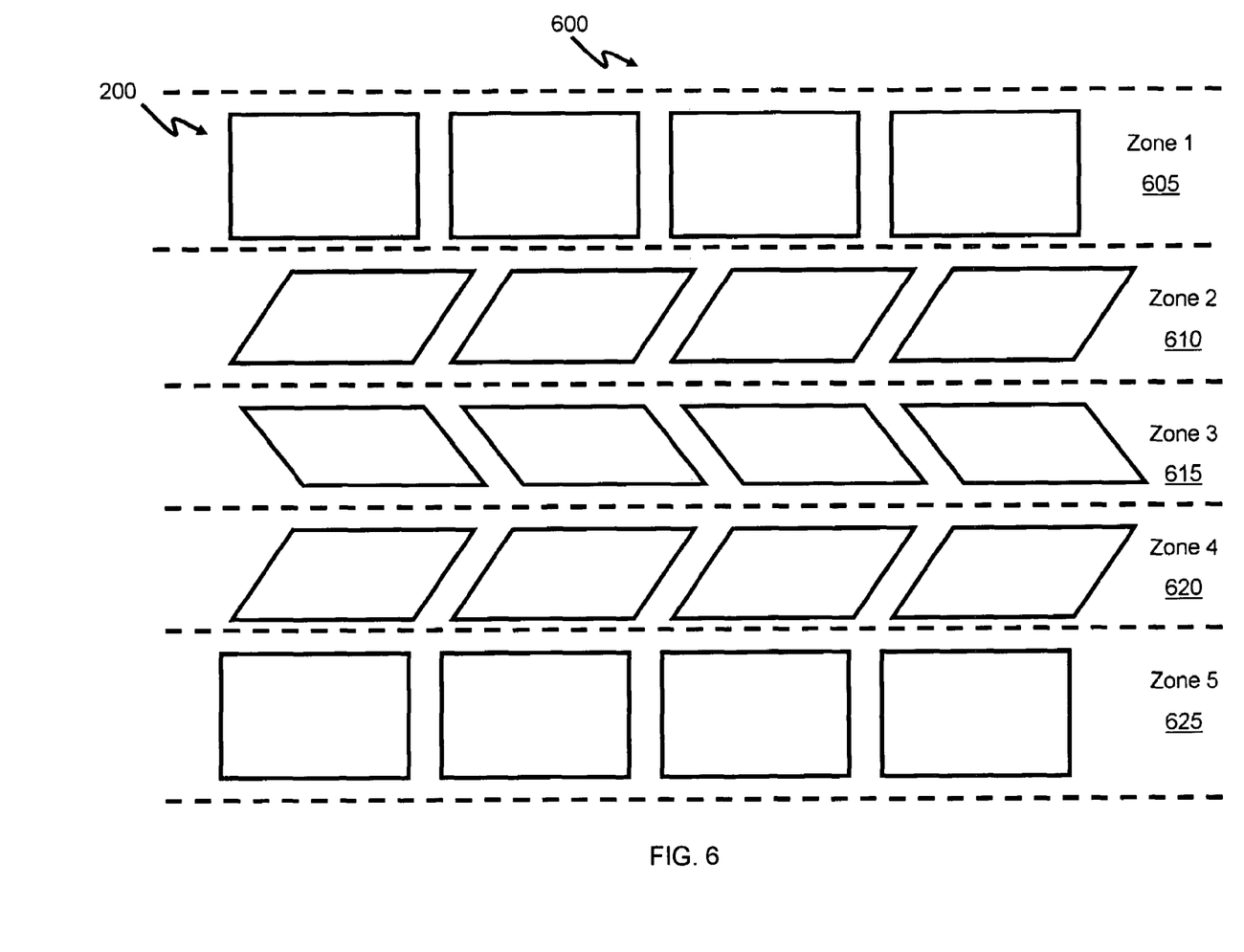
FIG. 6 shows an exemplary zonal breakdown of the tread pattern that has been established system for tread pattern noise optimization, in accordance with the present invention.

FIG. 6 shows an exemplary zonal breakdown of the tread pattern 600 that has been established with the present invention. In this example, the tread pattern 600 is comprised of five zones, zone 1 through zone 5, which are indicated as 605, 610, 615, 620, and 625. The tread patterns are modified by adjusting various ribs of the tread pattern in the circumferential direction. The zones allow the user to establish the constraints of the modifications. The user can specify which zones are allowed to be adjusted. For example, the user can establish that zone 2 (reference 610), zone 3 (reference 615), and zone 4 (reference 620) can be adjusted, whereas zone 1 (reference 605) and zone 5 (reference 625) are not eligible to be adjusted. For the zones that are deemed adjustable, the user can specify the maximum and minimum adjustment increments. These define the design space. The use of the zones gives the user the ability to specify which parts of the tread design may be modified. This allows the user to consider other tire factors, such as traction and performance, by establishing limits to how much the original tread pattern may be modified. The system then adjusts the tread pattern accordingly, and computes the FDVF of the modified tread pattern. This process is repeated for each modification increment for each tread zone of the design space to generate a plurality of modified tread patterns, and the corresponding FDVF for each generated tread pattern.

Figure 7:
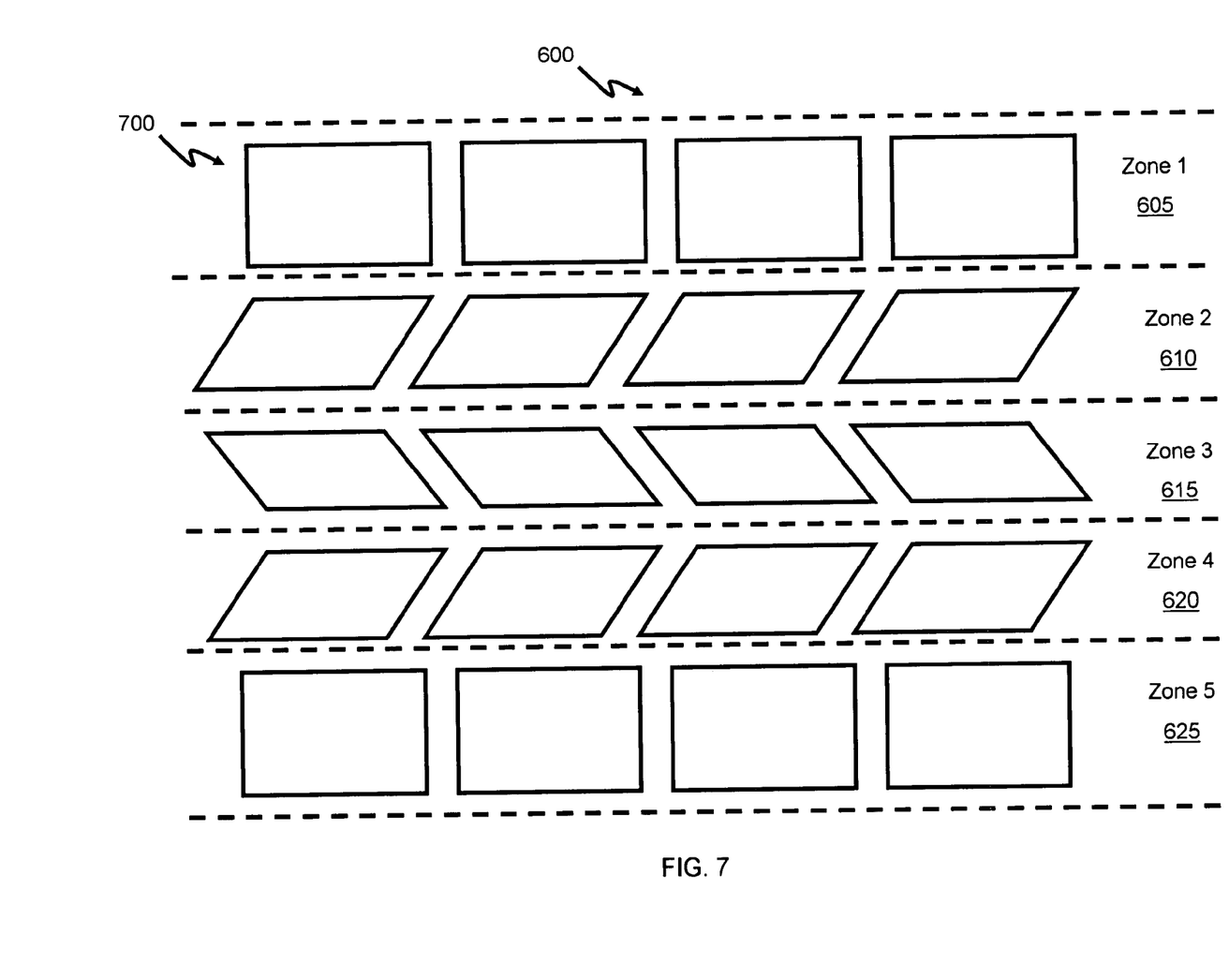
FIG. 7 shows an exemplary modified tread pattern system for tread pattern noise optimization, in accordance with the present invention.

FIG. 7 shows an exemplary modified tread pattern 700, in which some of the ribs have been shifted from their position in the original tread pattern 200, as shown in FIG. 2 and 6. In this case, the ribs in zone 2 (reference 610), zone 3 (reference 620), and zone 4 (reference 625) have been shifted left, as compared with the original tread pattern 200. Zone 1 (reference 605) and zone 5 (reference 625) are not shifted from the original tread pattern 200. While this example shows only a portion of the ribs as being shifted, it is possible to apply shifts to all the ribs of a given tread pattern.

Figure 8:
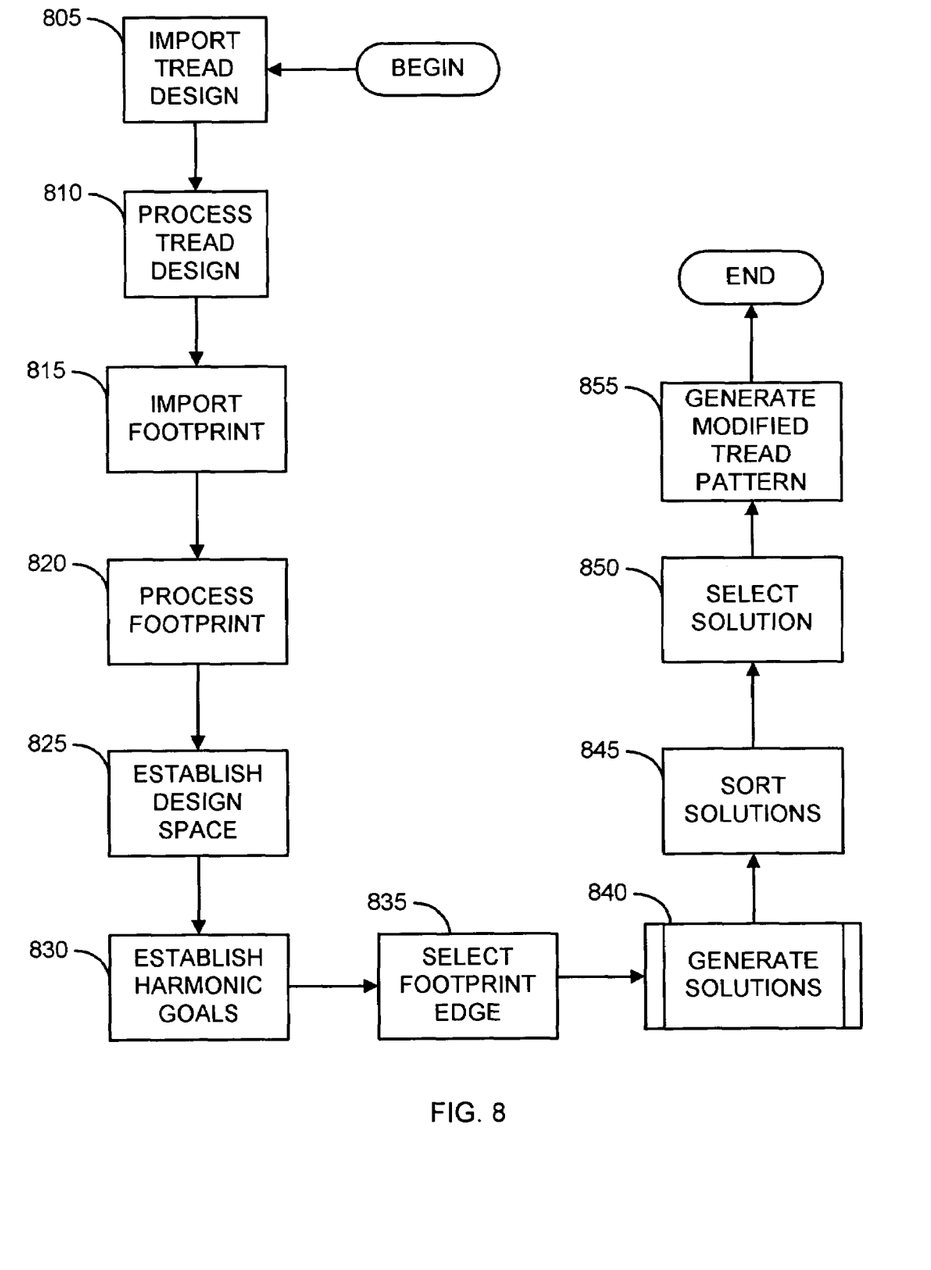
FIG. 8 is a flowchart of the method of tread pattern noise optimization system for tread pattern noise optimization, in accordance with the present invention.

FIG. 8 is a flowchart of the steps performed for tread pattern noise optimization. In step 805, a tread design is imported into the system of the present invention from a computer-aided drawing (CAD) file. The CAD file contains three-dimensional information that describes the shape of the tread blocks that comprise the tread pattern, as well as the depth of the grooves within the tread pattern. In step 810, the tread design is processed. Processing entails laterally sampling the tire at multiple intervals, or sub zones, to establish the tread depth variation around the tire circumference at each interval. In a preferred embodiment, 600 sampling areas (reference 505 in FIG. 5A) are taken where tread depth is described at equidistant intervals around the circumference of the tire at each of the multiple intervals. At these sampling areas (505), the sub zone width, tread depth and circumferential interval yields the void function. The void function in the spatial domain is transformed to the frequency domain using a Fast Fourier Transform (FFT). This generates a Frequency Domain Void Function, referred to as FDVF.

At step 815, a footprint data file is imported into the system of the present invention. In a preferred embodiment, the footprint is in a bitmap format. However, any image or CAD formats can be used, so long as it indicates the outline of the footprint. The bounds of the footprint are referred to as the "footprint envelope", see FIG. 4. At step 820, the footprint is processed. Processing comprises the steps of scaling the footprint to align with the tread design, performing edge detection to determine the footprint envelope, and performing interpolation to form the footprint envelope, as shown in FIG. 5. The interpolation may be performed by applying a spline fit. The leading edge or trailing edge of the footprint are used to coordinate the timing or phasing of the FDFV's of each of the subzones so they may be summed to equal the FDFV of each tread zone or of the entire tread pattern footprint edge.

At step 825, the design space is established. This information is provided by the user, and establishes one or more "zone boundaries", as shown in FIG. 6. Zone boundaries define areas of the tread to which an adjustment may be applied. These areas are referred to as "zones" and are comprised of adjacent subzones. Typically, zone boundaries will define an area that includes a rib. In creating a modified tire tread pattern, one or more of the ribs of the original tread pattern may be shifted circumferentially by shifting each of the subzones equally. Another tread modification available is termed a distortion, whereby the circumferential shift of each subzone varies linearly from one zone boundary to the other, providing an angular distortion of the tread blocks and lateral grooves. Another option is to "pair" zones and shift them in a coordinated symmetry appropriate to the tread design. Symmetries available are termed tun-around or directional. For example, for a turn-around symmetry for the shoulder ribs as the top shoulder shifts left the bottom shoulder shifts right by the same amount, maintaining the turn-around symmetry. For directional symmetry, they would both shift the same direction. The zones to be modified, the type of modification, the range of shifts and the number if increments of the shifts are referred to as the design space.

At step 830, harmonic goals are established. This provides bounds for the range of solutions that are evaluated by the system of the present invention. A maximum and minimum noise energy value is specified, along with a weight value. Typically, the weight value will be 1.0, which indicates the worst case. All other solutions are normalized with respect to the worst case, such that a value of 1.0 corresponds to the worst solution, and a value of 0 corresponds to the best solution. Other parameters specified include the maximum number of requested solutions, and the solution separation distance (SSD). The SSD is typically specified in millimeters. This helps separate solutions pertaining to distinct local optima from the numerous solutions within the exhaustive design space search.

At step 835, a footprint edge is selected. Either the leading edge, or the trailing edge may be used. In step 840, one or more modified tread patterns, referred to as "solutions", are generated. This comprises computing the void function at each sample sampling area (505) around the circumference of the tire. Eligible ribs are then shifted an amount determined by the value of the design space circumferential increments, and the process is repeated exhaustively. At step 845, the solutions are sorted, according to the normalized weight value. The solution with a value of 0 is the best solution in terms of the void function. The best solutions are presented for review, up to the maximum number requested and subject to minimum differences specified by the SSD value. The SSD helps filter out non optimal solutions within the design space pertaining to the same local optima and provides a more tractable review of different local optima or solution types.

In step 850, the user makes a selection from one of the solutions. While a particular solution may be the "best" solution, the resulting tread pattern may not be desirable and a solution of another type or local optima may be "best". The user make's a selection based on experience and other indefinable factors. In step 855, the desired solution (modified tread pattern) is displayed or printed to aid the solution selection process and help define the chosen solution. Then, the modifications to the tread design are described and the original CAD renderings can be modified accordingly.

Figure 9:
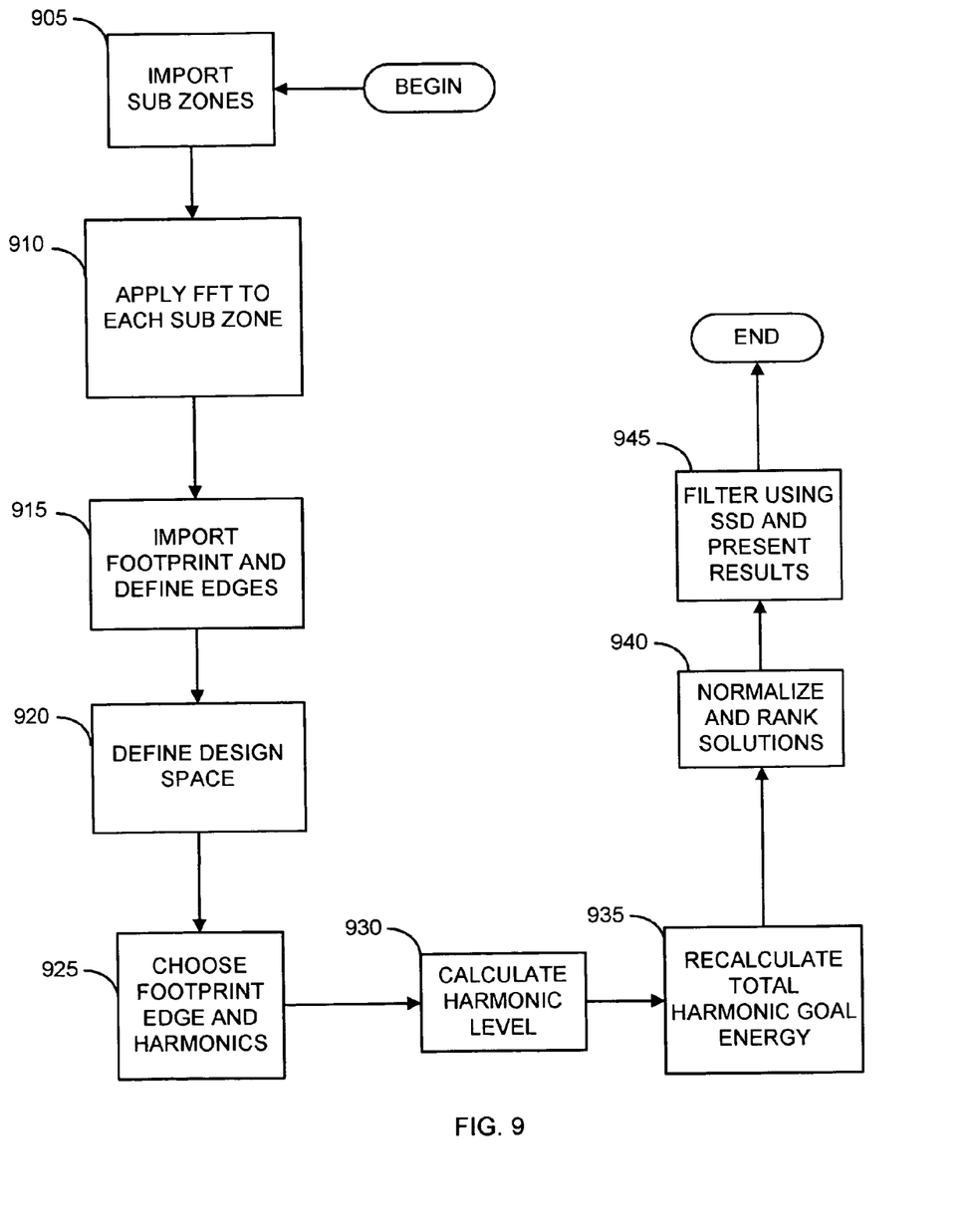
FIG. 9 is a flowchart indicating the steps for generating solutions system for tread pattern noise optimization, in accordance with the present invention.

FIG. 9 is a flowchart indicating the steps for generating solutions (step 840 of FIG. 8). In step 905, the tread design being analyzed is brought in as 601 strips of tread depth information (4096 points of information equally spaced around the circumference of the tire). These points of information are referred to as sub zones. In step 910, for each of the sub zones the FFT is applied to obtain the harmonic domain void function of each strip. In step 915, bring in a footprint and define the leading or trailing edges. In step 920, define the design space including which zones (as shown in FIG. 7) which determine how the sub zones are grouped into the zones and how the zones are shifted and the increments of how much the zones are shifted. In step 925, we choose the leading or trailing edge of the footprint and which harmonics will be considered in the harmonic goal (total value representing the noise of the design configuration for the tire being analyzed). In step 930, calculate the harmonic level for the original design and the selected edge being evaluated. In step 935, recalculate the total harmonic goal energy for each possibility within the design space. In step 940, all cases are normalized and ranked. In step 945, the SSD is used to ignore cases which are close to the local optima and the requested number of solutions are presented for review.

Figure 10:
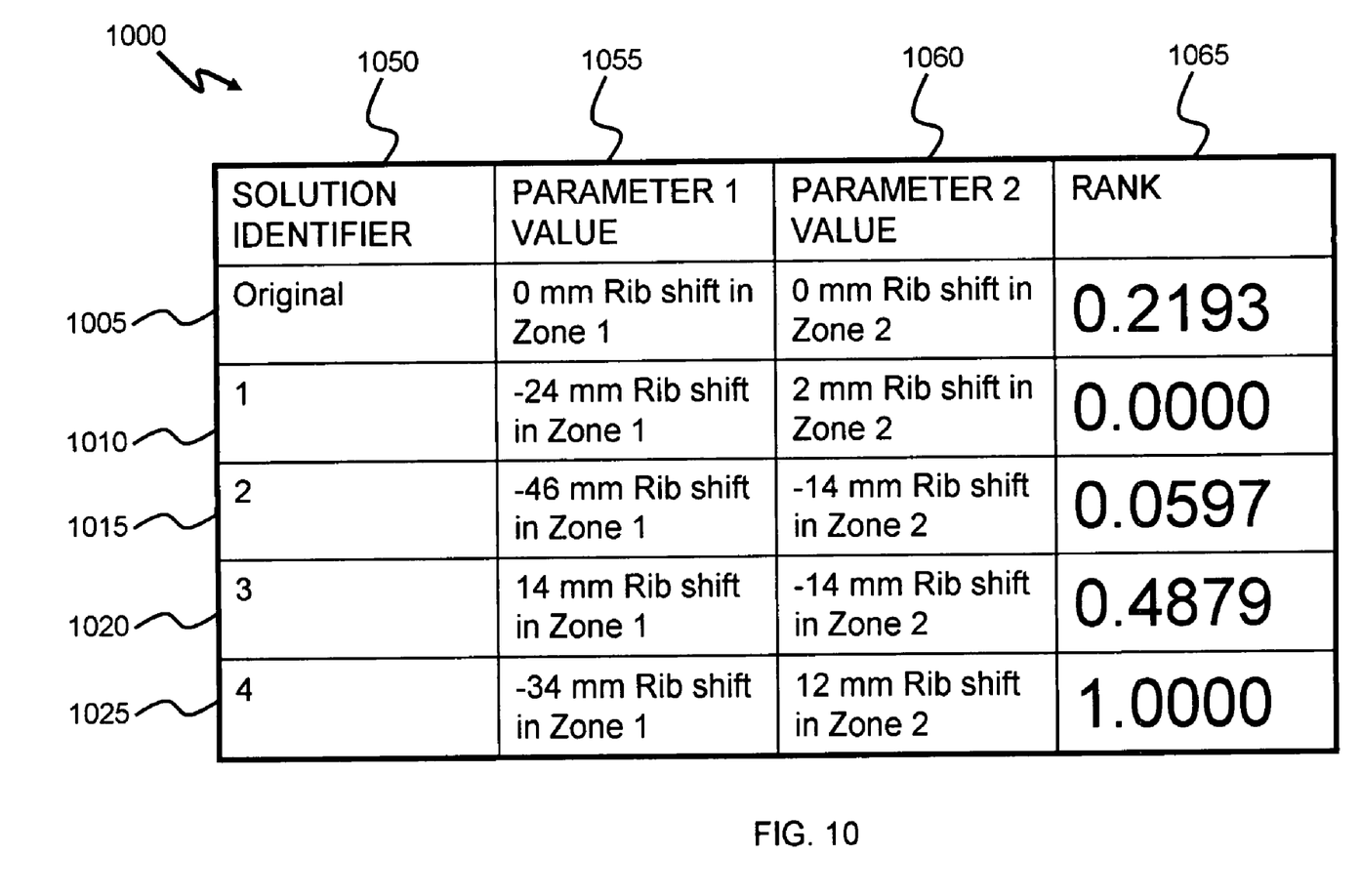
FIG. 10 shows an exemplary user interface of the present invention for providing a plurality of solutions system for tread pattern noise optimization, in accordance with the present invention.

FIG. 10 shows an exemplary user interface 1000 of the present invention for providing a plurality of solutions. Column 1050 contains a solution identifier. The solution identifier is a number or alphanumeric label used to identify each solution. Column 1055 contains values for parameter 1. In this case, parameter 1 refers to the amount of shift applied to the rib in zone 1. Column 1060 contains similar data for parameter 2. Column 1065 contains a normalized ranking. Each solution is displayed on a row. Row 1005 indicates the solution for the original tread pattern that was input into the system of the present invention. Row 1010 indicates the best solution. The parameter value columns 1055 and 1060 provide details on how the original tread pattern was modified to create the new tread pattern. Rows 1015, 1020 and 1025 indicate other solutions, sorted in order from best to worst.

It will be understood that the present invention may have various other embodiments, such as combinations of the algorithms described herein. For example, in addition to providing the user interface shown in FIG. 10, it is also possible to provide a graphical display of the spatial domain void function and FDVF for each solution. Furthermore, it is possible to provide graphical representation and numerical values for the void function on a rib-by-rib basis for a given tread pattern.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for modifying an existing tread pattern of a tire, comprising the steps of:

importing an original tread design of the tire from a CAD file comprising the three-dimensional shape of tread blocks that form the existing tread pattern as well as the depth of grooves between the tread blocks within the existing tread pattern, the tread blocks being arranged in rows known as ribs;

processing said original tread design to establish a plurality of sampling areas and determining a void value corresponding to a volume of the grooves that separate the tread blocks at each of said sampling areas;

importing a data file of a tire footprint;

processing said imported tire footprint by scaling the footprint to align with the original tread design, performing edge detection to determine a footprint envelope and performing interpolation to form the footprint envelope;

establishing a design space of one or more zone boundaries defining sampling areas of the original tread design which can be adjusted;

establishing harmonic goals corresponding to a specified maximum and minimum tire noise;

selecting an edge across each of the zone boundaries of said imported tire footprint;

computing a void value corresponding to the volume of the grooves that separate the tread blocks of the imported tire footprint at each of said sampling areas crossing the edge of the footprint at the intersection of the footprint envelope and the tread pattern around the circumference of the tire;

incrementally progressing the tire footprint around the tire circumference and recalculating the void values at each increment;

plotting all of the void values around the circumference of the original tread design to determine the void function of the design space;

generating a plurality of modified tread patterns by shifting the sampling areas of the original tread pattern;

computing the void function of said sampling areas of the design space comprising the volume of the grooves between tread blocks crossing the footprint edge for each of said modified tread patterns;

associating a numerical value for the void function of said sampling areas of said plurality of modified tread patterns, said numerical value of said sampling areas providing a ranking of tire noise characteristics of the original tread patterns and the modified tread patterns;

sorting the plurality of modified tread patterns based on the best corresponding to the numerical values for the void functions to achieve the minimum tire noise; and displaying the sorted plurality of modified tread patterns based on the best corresponding to the numerical values for the void functions on an interface of tire equipment.

2. The method of claim 1, wherein the step of processing said tire footprint further comprises:
  performing edge detection on said footprint;
  performing interpolation between the outer edges of said footprint;
  whereby a line circumscribing said footprint forms a footprint envelope.

3. The method of claim 2, wherein the method of interpolation is a spline fit.

4. The method of claim 1, wherein the step of generating a plurality of modified tread patterns comprises the steps of:
  shifting at least one rib of said imported tire footprint to create a plurality of modified tread patterns;
  converting said computed void function for each of said modified tread patterns to the frequency domain to generate a frequency domain void function for each of said modified tread patterns;
  evaluating said frequency domain void function against said harmonic goals;
  generating a numerical value for said frequency domain void function;
  normalizing said numerical value;
  whereby said numerical value is presented to a user, sorted amongst other numerical values corresponding to other tread patterns, such that multiple tread patterns can be quantitatively compared with each other.

* * * * *